(12) United States Patent
Blake

(10) Patent No.: X3252
(45) Date of Patent: Nov. 16, 1820

(54) BEE-HIVE

(76) Inventor: Edward Blake

UNITED STATES OF AMERICA.

*TO ALL TO WHOM THESE LETTERS PATENT SHALL COME:*

WHEREAS EDWARD BLAKE, *a Citizen of the United States, hath alledged that he has invented a new and useful improvement in the*

BEE HIVE, which improvement he states has not been known or used before his application; hath made oath that he does verily believe that he is the true inventor or discoverer of the said improvement; hath paid into the treasury of the United States the sum of thirty dollars, delivered a receipt for the same, and presented a petition to the Secretary of State, signifying a desire of obtaining an exclusive property in the said improvement, and praying that a patent may be granted for that purpose:

THESE ARE THEREFORE to grant, according to law, to the said EDWARD BLAKE, his heirs, administrators or assigns, for the term of fourteen years, from the sixteenth day of November one thousand eight hundred and twenty the full and exclusive right and liberty of making, constructing, using and vending to others to be used, the said improvement; a description whereof is given in the words of the said EDWARD BLAKE himself, in the schedule hereto annexed, and is made a part of these presents.

IN TESTIMONY WHEREOF, I have caused these Letters to be made Patent, and the Seal of the United States to be hereunto affixed.

GIVEN under my hand, at the City of Washington, this sixteenth day of November in the year of our Lord one thousand eight hundred and twenty and of the Independence of the United States of America the forty fifth.

JAMES MONROE.

*BY THE PRESIDENT,*

JOHN QUINCY ADAMS,
*Secretary of State.*

*City of Washington,* To Wit:
I DO HEREBY CERTIFY, That the foregoing Letters Patent were delivered to me on the sixteenth day of November in the year of our Lord one thousand eight hundred and twenty to be examined; that I have examined the same, and find them conformable to law; and I do hereby return the same to the *Secretary of State*, within fifteen days from the date aforesaid, *to wit*; on this sixteenth day of November in the year aforesaid.

WM. WIRT, *Attorney General of the United States.*

THE SCHEDULE referred to in these Letters Patent, and making part of the same, containing a description in the words of the said Edward Blake himself of his improvement in the construction of the Bee Hive.

This improvement consists in the construction of a hive so that any quantity of honey, from a very small portion, to nearly one third part of the whole, may be extracted at any time from the hive, without any serious injury to the bees, or without the destruction of any of the lives of those valuable little animals; and so that whenever there is a deficiency of honey for the support of the bees, or no more than is necessary for that purpose, it may be supplied or taken away at pleasure. Let a square box of the size of the common hive, or any other convenient size, be made of pine or any other suitable wood. Let a number of bars be placed horizontally at about one third part of the distance from the top of the hive, so that the space between each bar shall be about two fifths of an inch. Let any number of separate boxes, say nine, or more or less, be so made, that they shall fill up the whole space above the bars mentioned before, with any convenient thing inserted in the top of the boxes for the purpose of extending them at pleasure; and let there be a cover to be placed over the whole in such a manner as may be thought to be most convenient.

EDWARD BLAKE.

*Witnesses.*
RT. GOODENOW.
J. S. HOLMES.

DRAFTSMAN'S DIVISION.

*All communications should be addressed to* "The Commissioner of Patents, Washington, D. C."

2—328 a.

*DEPARTMENT OF THE INTERIOR,*

United States Patent Office.

*Washington, D. C.,* ............................., *189*..

*SIR:*

*The printed* copies ............ *of Patent No.* E Blake are ...... *exhausted.* Nov 16 1820

*As soon as reprinted a copy will be mailed you to complete your order.*

*By direction of the Commissioner:*

*Very respectfully,*

............................................

*Chief Clerk.*

314856-97-5m

BLAKE'S PATENT BEE HIVE.
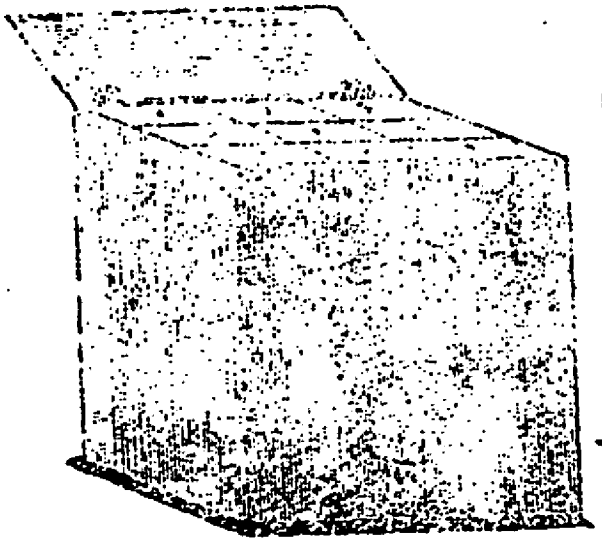
View of the top of the Hive, having the lid turned up to shew the tops of 9 boxes, each having a screw by which to draw it out. N. B. The number of boxes may be varied.
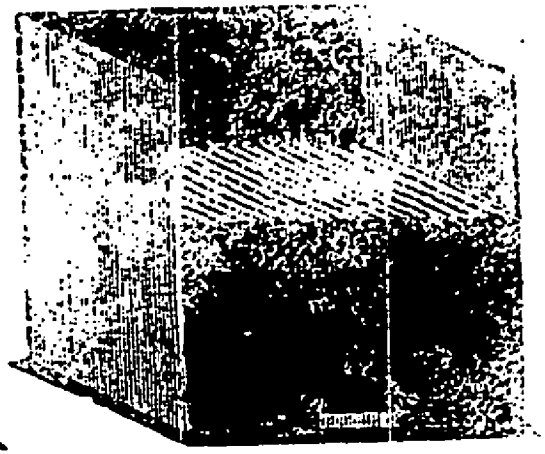
View of the grating on which the Boxes rest: each bar being 3-8ths of an inch from the next.